(12) United States Patent
Wu

(10) Patent No.: US 9,477,112 B2
(45) Date of Patent: Oct. 25, 2016

(54) DISPLAY DEVICE AND JOINT DISPLAY

(71) Applicant: Ye Xin Technology Consulting Co., Ltd., Hsinchu (TW)

(72) Inventor: I-Wei Wu, Hsinchu (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 123 days.

(21) Appl. No.: 14/497,725

(22) Filed: Sep. 26, 2014

(65) Prior Publication Data

US 2015/0092395 A1    Apr. 2, 2015

(30) Foreign Application Priority Data

Sep. 27, 2013  (TW) .............................. 102135217 A

(51) Int. Cl.
G02F 1/1335     (2006.01)
G02F 1/1333     (2006.01)
F21V 8/00       (2006.01)

(52) U.S. Cl.
CPC ....... *G02F 1/133524* (2013.01); *G02B 6/0051* (2013.01); *G02B 6/0061* (2013.01); *G02F 1/13336* (2013.01); *G02B 6/0078* (2013.01)

(58) Field of Classification Search
CPC ............ G02F 1/13336; G02F 1/1335; G02F 1/133509; G02F 1/133524; G02F 1/133605; G02F 1/133526; G02F 2001/133388; G02F 2001/133562; G02F 2001/133607; G02F 2203/62; G02B 27/1066; G02B 5/045; G02B 6/0061; G02B 6/0051; G02B 6/0078; H04R 1/028; H04R 7/12; H04R 2499/15; G06F 1/1609; G06F 1/1641
USPC .......... 345/1.1–1.3, 102, 690–694; 362/97.1, 362/97.2, 97.3, 97.4, 317, 339; 349/619, 349/629–630

See application file for complete search history.

(56) References Cited

U.S. PATENT DOCUMENTS

| | | | | |
|---|---|---|---|---|
| 6,483,482 B1* | 11/2002 | Kim | ............... | G02F 1/13336 345/1.1 |
| 6,927,908 B2* | 8/2005 | Stark | ............... | G02F 1/13336 345/1.3 |
| 8,531,351 B2* | 9/2013 | Choi | ............... | H01J 11/12 345/1.1 |
| 9,274,369 B1* | 3/2016 | Lee | ............... | G02F 1/133524 |
| 2003/0231144 A1* | 12/2003 | Cho | ............... | G02B 5/045 345/1.3 |
| 2006/0077544 A1* | 4/2006 | Stark | ............... | G02F 1/13336 359/448 |
| 2009/0059366 A1* | 3/2009 | Imai | ............... | G02B 27/2242 359/464 |
| 2010/0073641 A1* | 3/2010 | Han | ............... | G02B 5/06 353/38 |

(Continued)

FOREIGN PATENT DOCUMENTS

TW        I372295        9/2012

*Primary Examiner* — Anne Hines
*Assistant Examiner* — Jose M Diaz
(74) *Attorney, Agent, or Firm* — Zhigang Ma

(57) ABSTRACT

The present invention relates to a display device and a joint display. The display device includes a display panel and a cover lens. The display panel includes a main display region and an edge display region. The cover lens includes a transmission portion located on the main display region and compensation portion located on the edge display region. The compensation portion is configured to distribute the image of the edge display region to the outside of the edge display region away from the main display region. The compensation portion includes a light incident surface, a light emitting surface, and a light guiding channel. The light guiding channel extends from the light incident surface to the light emitting surface, and an area of the light emitting surface is greater than an area of the light incident surface.

17 Claims, 24 Drawing Sheets

(56) References Cited

U.S. PATENT DOCUMENTS

2010/0177261 A1* 7/2010 Jin ................. G02F 1/13336 349/58
2010/0259566 A1* 10/2010 Watanabe ............ G02B 3/08 345/690
2011/0109535 A1* 5/2011 Watanabe ......... G02F 1/13336 345/87
2011/0279487 A1* 11/2011 Imamura ............. G09G 3/3611 345/690
2015/0286457 A1* 10/2015 Kim ................... G06F 3/1446 345/581

* cited by examiner

DISPLAY DEVICE AND JOINT DISPLAY

FIELD

The subject matter herein generally relates to a display device and a joint display, and more particularly, to a joint display with an image compensating apparatus to provide a seamless image.

BACKGROUND

In the display industry, display devices are widely used in consumer electronic products. As the development of technology and the trend of market demand, an increasing need is to provide a big display device for displaying an image having a big size. In some situations, in order to obtain a display panel of a relative large size, such as more than 200 inches, for displaying much more information, it may be manufactured by a large number of serialization displays joined together in a plane. However, the borders between two adjacent display panels jointing together may reduce a displaying quality. So, the border is manufactured narrower or less visible, that is helpful for a signal display panel, or joined display panels to eliminate non-display regions, or display an image on a screen larger than a reality display region of such display panels. Therefore, there is room for improvement in the art.

BRIEF DESCRIPTION OF THE DRAWINGS

Implementations of the present technology will now be described, by way of example only, with reference to the attached figures.

DETAILED DESCRIPTION

Figure 1:
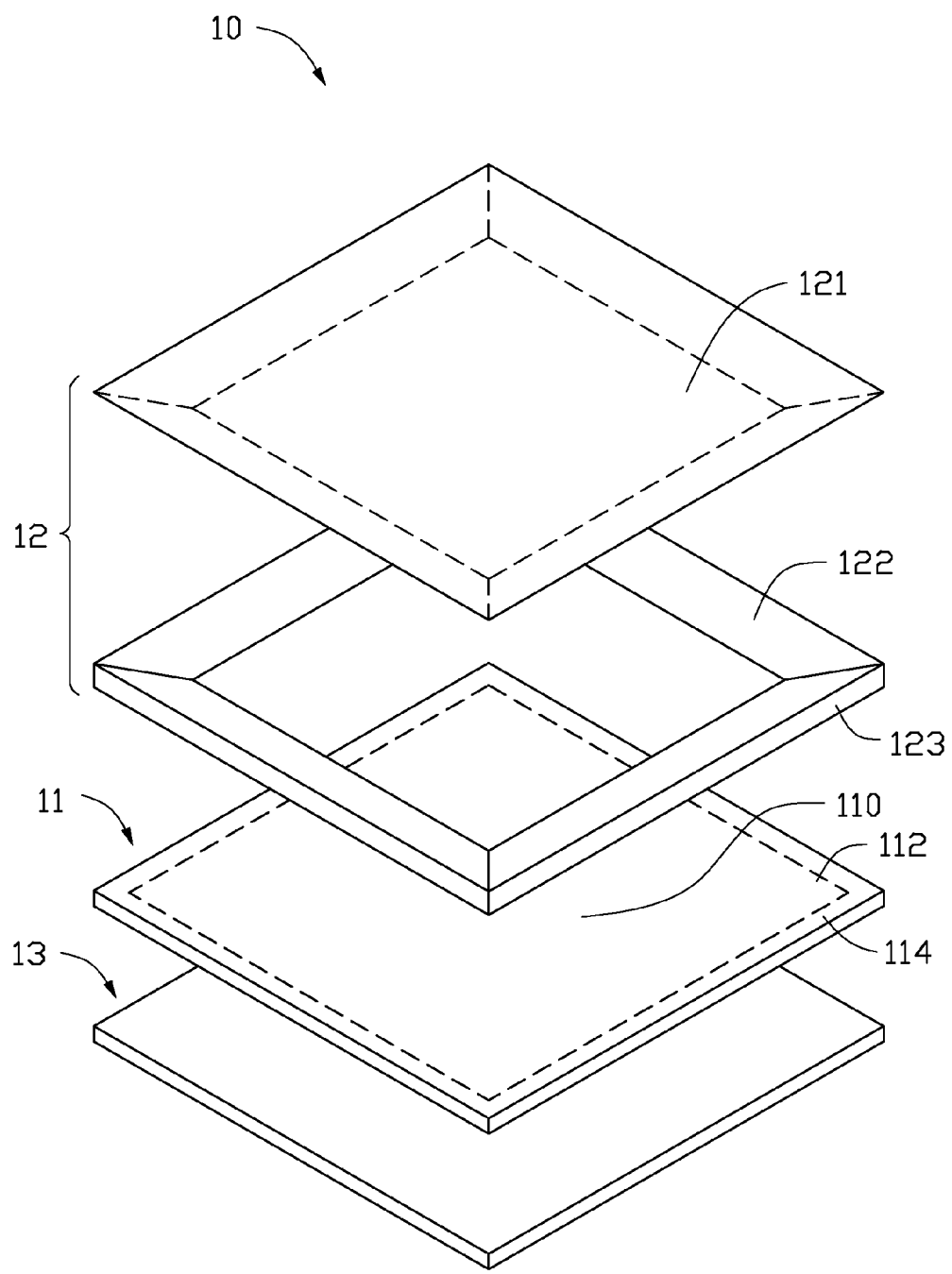
FIG. 1 is an isometric, exploded view of a first kind of display device of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure is described in relation to a display device and a joint display.

FIG. 1 is an exploded view of a display device 10 of the present disclosure. The display device 10 includes a display panel 11, a cover lens 12, and a backlight module 13. Further, the display panel 11 can be a liquid crystal display panel, an organic light-emitting diode display panel, a plasma display panel, and an electro wetting display panel. In this embodiment, the display panel 11 is a liquid crystal display panel. A cover lens 12 is positioned over the display panel 11 and the backlight module 13 is positioned below the display panel 11 in order to provide incident light. It can be understood that the display panel 11 doesn't include the backlight module 13 when the display panel 11 is an organic light-emitting diode display panel, a plasma display panel, or an electro wetting display panel.

Figure 2:
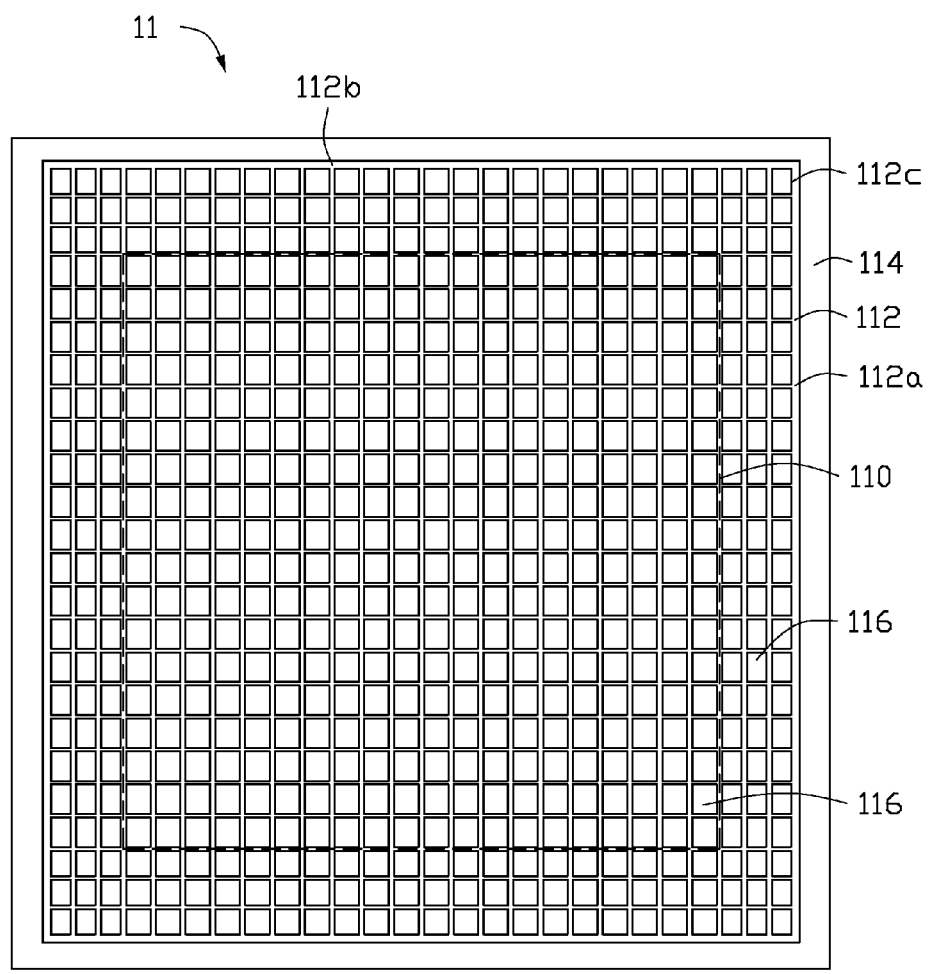
FIG. 2 is a diagrammatic view of the display device of FIG. 1.

The display panel 11 includes a main display region 110, a periphery display region 112 located at one side of the main display region 110 and a non-display region 114. The non-display region 114 can be a frame of the display device 10 which displays no image. FIG. 2 is a diagrammatic view of the display device 10 of FIG. 1. The main display region 110 and the periphery display region 112 both include a number of pixels 116 and the pixels 116 in the main display region 110 and the periphery display region 112 are arranged as a matrix.

The pixels 116 in the main display region 110 are evenly arranged and are equal in size. A density of the pixels 116 in the main display region 110 (per unit area) is smaller than a density of the pixels 116 in the periphery display region 112. In particular, a space between adjacent pixels 116 in the main display region 110 is substantially equal to or bigger than a space between adjacent pixels 116 in the periphery display region 112, and sizes of the pixels 116 in the periphery display region 112 is smaller than sizes of the pixels 116 in the main display region 110. Such as, lengths of the pixels 116 in the periphery display region 112 is smaller than lengths of the pixels 116 in the main display region 110, or widths of the pixels 116 in the periphery display region 112 are smaller than widths of the pixels 116 in the main display region 110. Further, it can be understood that a length of a pixel 116 is a length of the pixel 116 along a Y direction perpendicular to an X direction, and a width of the pixel 116 is a width of the pixel 116 along the X direction.

In this embodiment, a length of the pixel 116 in the periphery display region 112a at the left side and the right side of the display region 110 is equal to a length of the pixel 116 in the main display region 110 but a width of the pixel 116 in the periphery display region 112a at the left side and the right side of the display region 110 is smaller than a width of the pixel 116 in the main display region 110. A width of the pixel 116 in the periphery display region 112a at the left side and the right side are equal.

Furthermore, a width of the pixel 116 in the periphery display region 112b at the top side and the bottom side of the display region 110 is equal to a width of the pixel 116 in the main display region 110 but a length of the pixel 116 in the periphery display region 112b at the top side and the bottom side of the display region 110 is smaller than a length of the pixel 116 in the main display region 110. A length of the pixel 116 in the periphery display region 112a at the top side and the bottom side are equal.

In addition, for the pixels 116 in the periphery display region 112c at the four corners of the display panel 11, a length of the pixel 116 at one corner of the periphery display region 112c is smaller than a length of the pixel 116 in the main display region 110 and a width of the pixel 116 at one corner of the periphery display region 112c is small than a width of the pixel 116 in the main display region 110. In detail, a length of the pixel 116 at one corner of the periphery display region 112c can be equal to a length of the pixel 116 at the left and right side of the periphery display region 112a and a width of the pixel 116 at one corner of the periphery display region 112c can be equal to a width of the pixel 116 at the top and bottom side of the periphery display region 112b.

Figure 3:
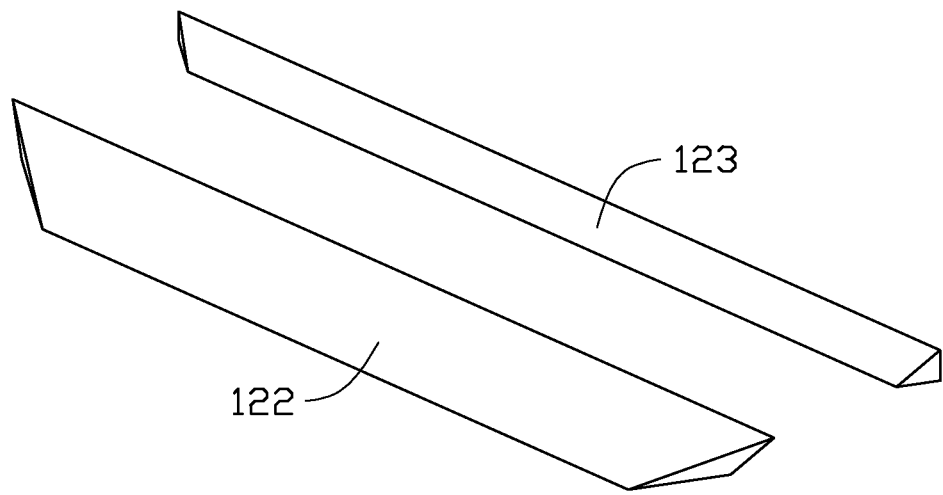
FIG. 3 is an isometric view of a compensation portion and a support portion of FIG. 1.

The cover lens 12 includes a transmission portion 121, a compensation portion 122 and a support portion 123. In this embodiment, the number of the compensation portion 122 and the number of the support portion 123 is four. Four compensation portions 122 and the support portions 123 are joined together to form a hollow rectangular frame. Referring to FIG. 3, FIG. 3 is an isometric view of the compensation portion 122 and the support portion 123. The transmission portion 121 is positioned in the main display region 110 and is connected to the compensation portion 122. The compensation portion 122 is positioned in the periphery display region 112 and is configured to enlarge and to expand the image of the periphery display region 112 to the periphery display region 112 and to the outside of the periphery display region 112 away from the main display region 110. The support portion 123 is positioned in the non-display region 114 and connected to the compensation portion 122 in order to support the compensation portion 122.

Figure 4:
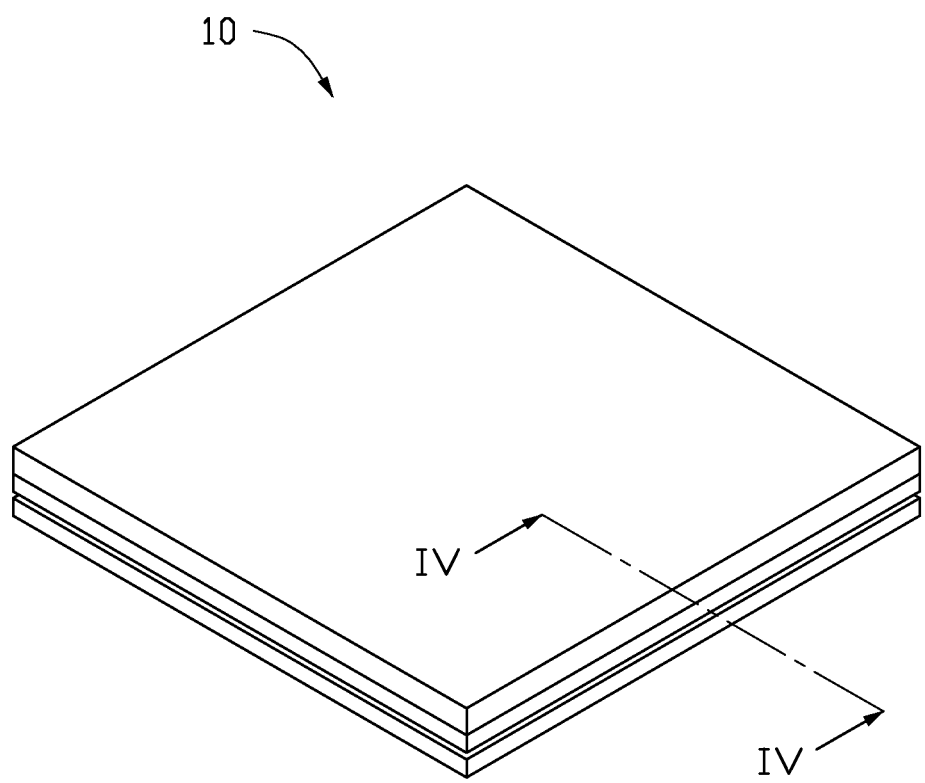
FIG. 4 is an isometric view of the display device of FIG. 1.
Figure 5:
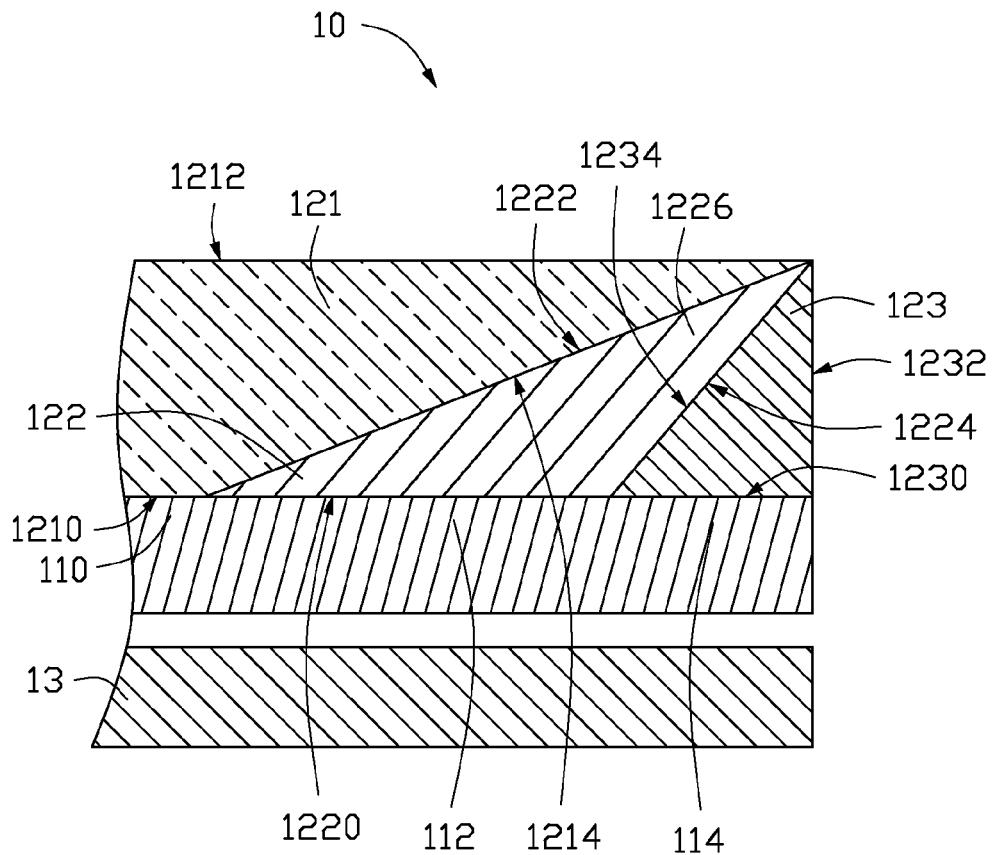
FIG. 5 is a cross-sectional view taken along line IV-IV of FIG. 4.

Referring to FIG. 4 and FIG. 5, FIG. 4 is an isometric view of the display device 10 and FIG. 5 is a cross-sectional view taken along line IV-IV of FIG. 4. In detail, the cross-sectional area of the compensating portion 122 can be an obtuse angle triangle, which includes a first light incident surface 1220, a first light emitting surface 1222 and an inclined surface 1224 connected between the first light incident surface 1220 and the first light emitting surface 1222. The first light incident surface 1220 is positioned parallel to the periphery display region 112. Furthermore, the first light emitting surface 1222 and the first light incident surface 1220 intersect with each other and define an acute angle. The inclined surface 1224 of the compensation portion 122 is located at a side away from the main display area 110 and the inclined surface 1224 and the first light incident surface 1220 define an obtuse angle. (Such as an obtuse angle of 135 degrees). The compensation portion 122 further includes a plurality of the light path independent from each other and a light guiding channel 1226 extending from the first light incident surface 1220 to the first light emitting surface 1222. The first light incident surface 1220 is projected at the first light emitting surface 1222 and the projected area is greater than the first light incident surface 1220. This configuration leads to expand a light beam being entered into the first light incident surface 1220 to the first light emitting surface 1222 via the light guiding channel 1226 so the image is enlarged and expanded in the periphery display region 112. The projected area covers the periphery display region 112 and the non-display region 114 so that the image of the periphery display region 112 is not only displayed above the periphery display region 112 but also is expanded to an area above the non-display region 114. Furthermore, a plurality of the light path is set substantially parallel to the inclined surface 1224.

Figure 6:
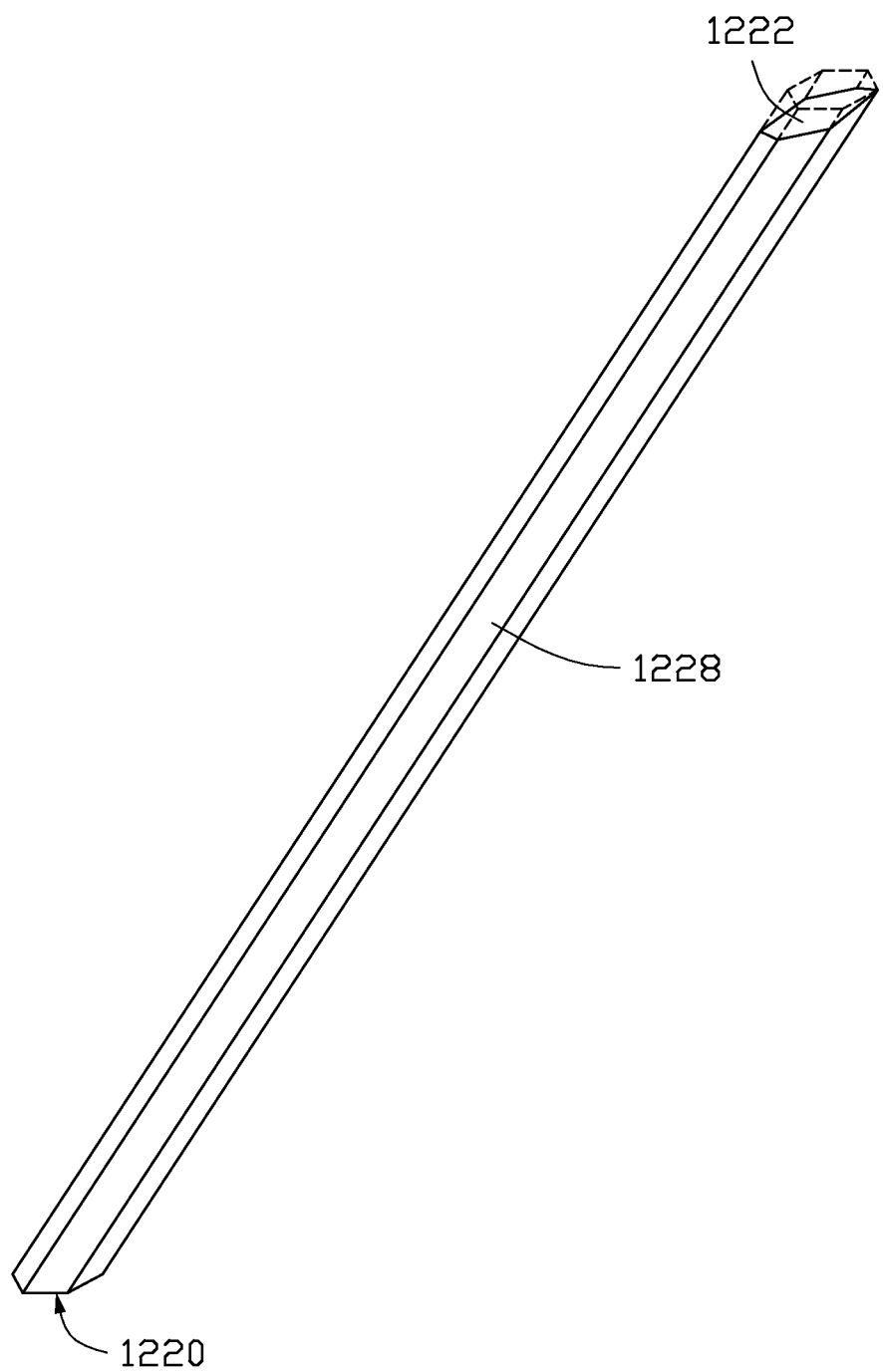
FIG. 6 is an isometric view of one kind of light guiding fiber of FIG. 5.

In this embodiment, the light guiding channel 1226 is defined by a plurality of light guiding fibers 1228. Referring to FIG. 6, FIG. 6 is an isometric view of one kind of light guiding fiber 1228. Each of the light guiding fibers 1228 extends from the light incident surface 1220 to the first light emitting surface 1222 and a cross-sectional area of the light guiding fiber 1228 is maintained constantly, which means a diameter of the light guiding fiber 1228 is constant. Therefore, it can be understood that in this embodiment the desired expansion can be achieved by adjusting an inclining degree of the light guiding fiber 1228. In detail, a cross-sectional area of the first light emitting surface 1222 of each light guiding fiber 1228 is greater than a cross-sectional area of the light incident surface 1220 of each light guiding fiber 1228. This configuration leads to the image displayed by a plurality of the pixels 116 in the periphery display region 112 is enlarged via the light guiding fibers 1228. The light guiding channel 1226 can also be formed of a plurality of optical fibers, the light guide plate, a quartz optical fiber, the glass fiber and other optical materials arrayed together.

The transmission portion 121 includes a second light incident light surface 1210, a second light emitting surface 1212 parallel to the second light incident light surface 1210, and a first connecting surface 1214 positioned between the second light incident surface 1210 and the second light emitting surface 1212. A cross-sectional area of the second light emitting surface 1212 is larger than a cross-sectional area of the second light incident surface 1210 so the first connecting surface 1214 is set as an inclination configuration to the second light emitting surface 1212. The second light incident surface 1210 is positioned above the main display region 110 and the first connecting surface 1214 is overlapped with the first light emitting surface 1222 of the compensation portion 122. In detail, the first connecting surface 1214 and the first light emitting surface 1222 are joined by glue together. Furthermore, the transmission portion 121 can be made of some transparent materials such as glass and transparent resin.

A cross-sectional area of the support portion 123 is a right triangle which further includes a bottom surface 1230, a first side 1232 perpendicular to the bottom surface 1230 and a second side 1234 connecting the bottom surface 1230 to the first side 1232. The second side 1234 is overlapped with the inclined surface 1224 of the compensation surface 122. In detail, the second side 1234 and the inclined surface 1224 of the compensation surface 122 can be joined together by glue. The support portion 123 can be made of some transparent materials such as glass and transparent resin or can be made of an opaque metal or plastic material.

In the present embodiment, the transmission portion 121, the support portion 123, and the compensation portion 122 are equal in height in a vertical direction of the display panel 11. The first light incident surface 1220 of the compensation portion 122, the second light incident surface 1210 of the transmission portion 121 and the bottom surface 1230 of the support portion 123 are formed on the same plane. Furthermore, the transmission portion 121, the support portion 123, and the compensation portion 122 are combined to form a substantially identical rectangular plate to the display panel 11. This plate is used as a cover lens 12 coving the display panel 11. In detail, the cover lens 12 and the display panel 11 can be joined by glue together.

Figure 7:
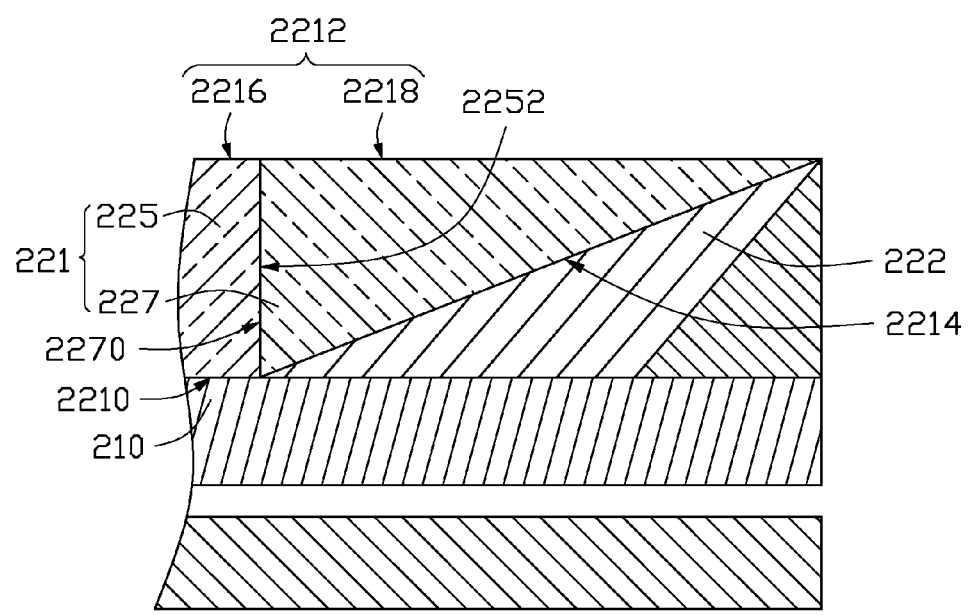
FIG. 7 is a cross-sectional view of a second kind of display device of the present disclosure.

FIG. 7 is a cross-sectional view of a second kind of display device 20 of the present disclosure. Basically, the second embodiment of the display device 20 is similar to the first embodiment of the display device 10. The main difference is that a transmission portion 221 of the second embodiment is different from the transmission portion 121 of the first embodiment. In detail, the transmission portion 221 of the second embodiment includes a main portion 225 and an edge portion 227. A second emitting surface 2212 includes a main area 2216 faced to a main display region 210 and an edge area 2218 of the main area 2216. The main portion 225 includes a bottom surface, a top surface parallel to the bottom surface, and a first connecting surface 2252 vertically connected to the bottom surface and the top surface. The bottom surface of the main portion 225 is defined by a second light incident surface 2210 of the main display region 210 and the top surface of the main portion 225 is defined by the second light emitting surface 2212 of the main area 2216. A cross-sectional area of the edge portion 227 is a triangle and the edge portion 227 includes a first connection surface 2214 connected to a compensation portion 222, a part of the second light emitting surface 2212 corresponding to the edge area 2218, and a second connecting surface 2270 corresponding to the first connecting surface 2252 of the main portion 225. The second connecting surface 2270 of the edge portion 227 is overlapped with the first connecting surface 2252 of the main portion 225. In detail, the second connecting surface 2270 and the first connecting surface 2252 can be joined by glue together.

Figure 8:
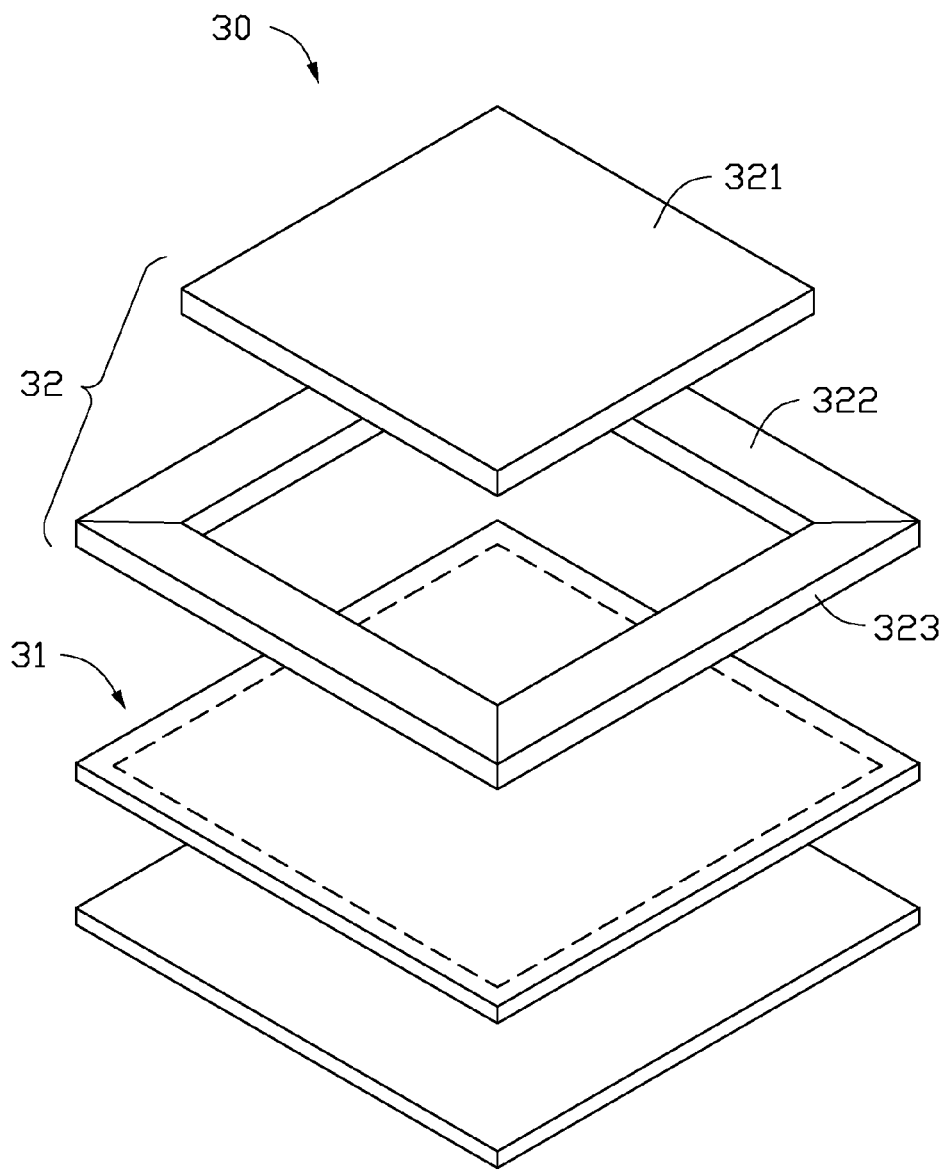
FIG. 8 is an exploded view of a third kind of display device of the present disclosure.
Figure 9:
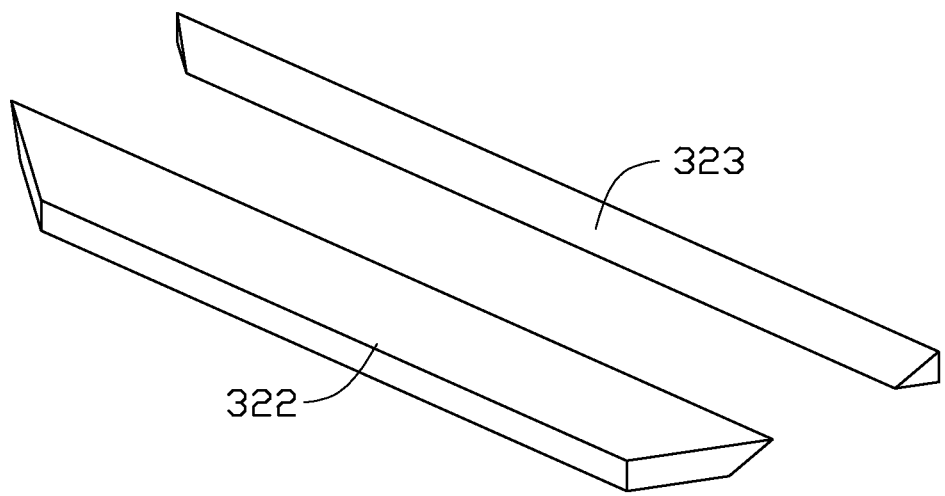
FIG. 9 is an isometric view of one kind of compensation portion and one kind of support portion of FIG. 8.
Figure 10:
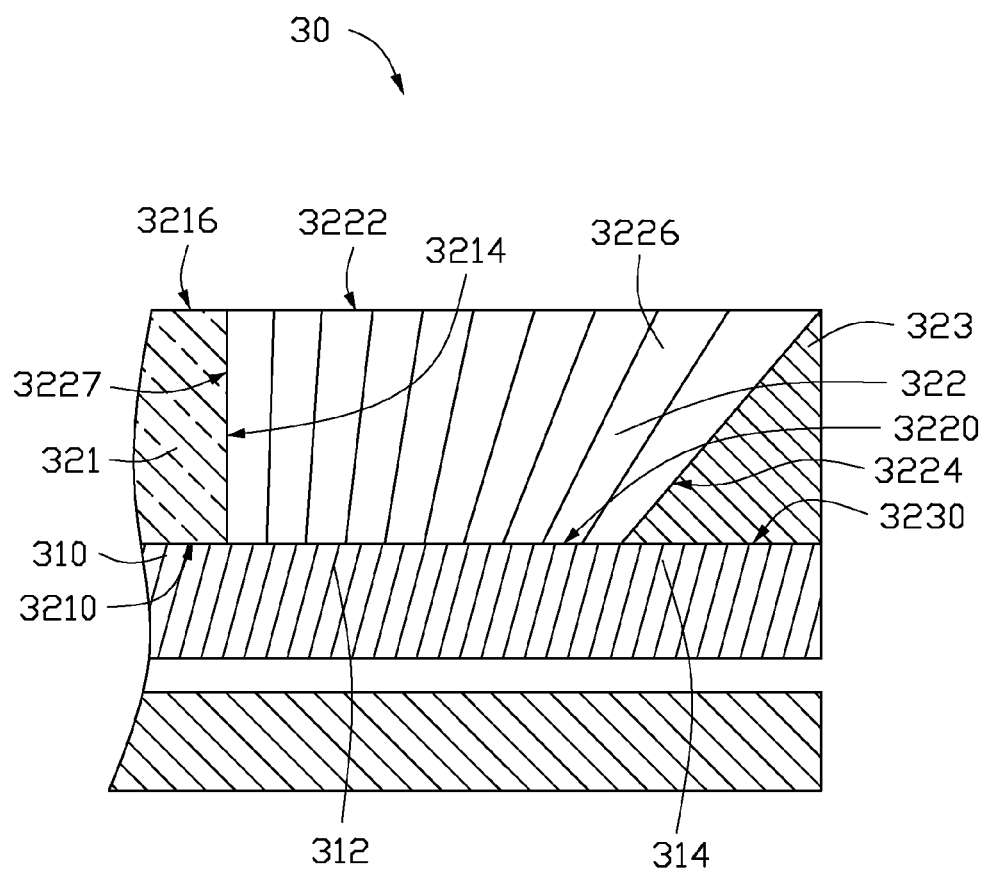
FIG. 10 is a cross-sectional view of the display device of FIG. 8.

Referring to FIG. 8, FIG. 9, and FIG. 10, FIG. 8 is an exploded view of a third kind of display device 30 of the present disclosure. FIG. 9 is an isometric view of one kind of compensation portion and one kind of support portion of FIG. 8. FIG. 10 is a cross-sectional view of the display device 30 of FIG. 8. Basically, the third embodiment of the display device 30 is similar to the first embodiment of the display device 10. The main difference is that: a transmission portion 321 and a compensation portion 322 are different. In detail, the cross-sectional area of the compensation portion 322 is trapezoidal and further includes a first light incident surface 3220 of a main display region 310, a first light emitting surface 3222 parallel to the first light incident surface 3220, an inclined surface 3224 connected to a support portion 323 and poisoned between the first light incident surface 3220 and the first light emitting surface 3222, and a first connecting surface 3227 positioned in the other side away from the inclined surface 3224 and positioned between the first light incident surface 3220 and the first light emitting surface 3222. The transmission portion 321 includes a second light incident surface 3210, a second light emitting surface 3212 and a second connecting surface 3214 vertically connected to the second light emitting surface 3212 and the second light incident surface 3210. Furthermore, the second light incident surface 3210 of the transmission portion 321 is positioned against the main display region 310 and the second light emitting surface 3212 of the transmission portion 321 and the first light emitting surface 3222 of the compensation portion 322 are formed on the same plane in order to constitute the display surface of the display device 30. The second connecting surface 3214 of the transmission portion 321 is joined with the first connecting surface 3227 of the compensation portion 322 by glue. The second light incident surface 3210 of the transmission portion 321, the first light incident surface 3220 of the compensation portion 322, and a bottom surface 3230 of the support portion 323 are formed on the same plane and positioned corresponding to the main display region 310 of a display panel 31, a periphery display region 312, and a non-display region 314.

Figure 11:
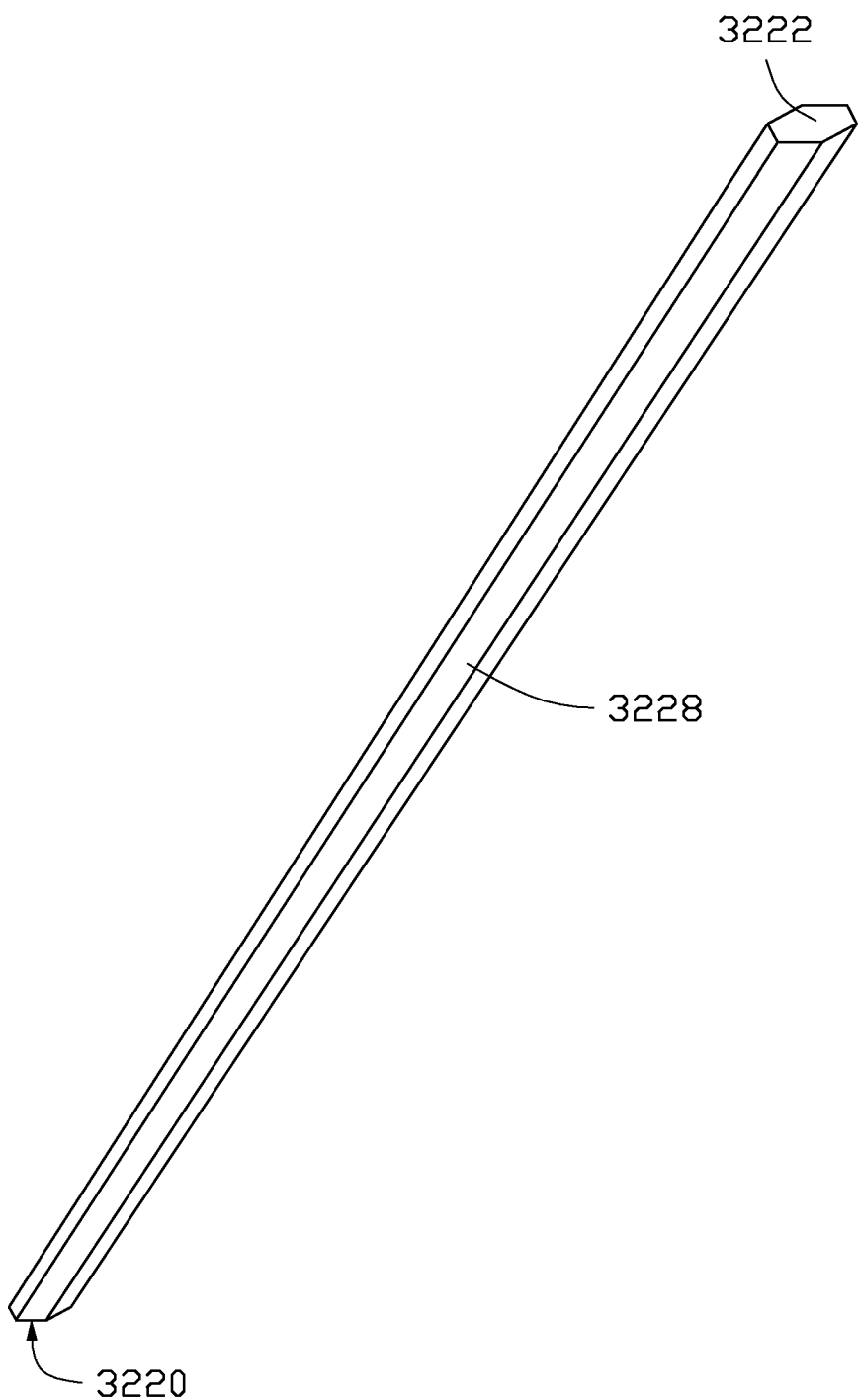
FIG. 11 is an isometric view of one kind of light guiding fiber of FIG. 10.

Further, of the display device 30, a cross-sectional area of a light guiding channel 3226 of the compensation portion 322 increases gradually from the first light incident surface 3220 to the first light emitting surface 3222. Referring to FIG. 11, FIG. 11 is an isometric view of one kind of light guiding fiber 3228 of the light guiding channel 3226. A cross-sectional area of the light guiding fiber 3228 is increased gradually from the light incident surface 3220 to the first light emitting surface 3222, which means a diameter of each light guiding fiber 3228 is increased gradually from the light incident surface 3220 to the first light emitting surface 3222. This configuration leads to an area in the light emitting surface 3222 of the light guiding fiber 3228 is greater than an area in the light incident surface 3220 of the light guiding fiber 3228 so that the image displayed in the periphery display region 312 is enlarged via the light guiding fiber 3228. Therefore, it can be understood that the desired expansion can be achieved by gradually increasing a diameter of the light guiding fiber 3228.

Figure 12:
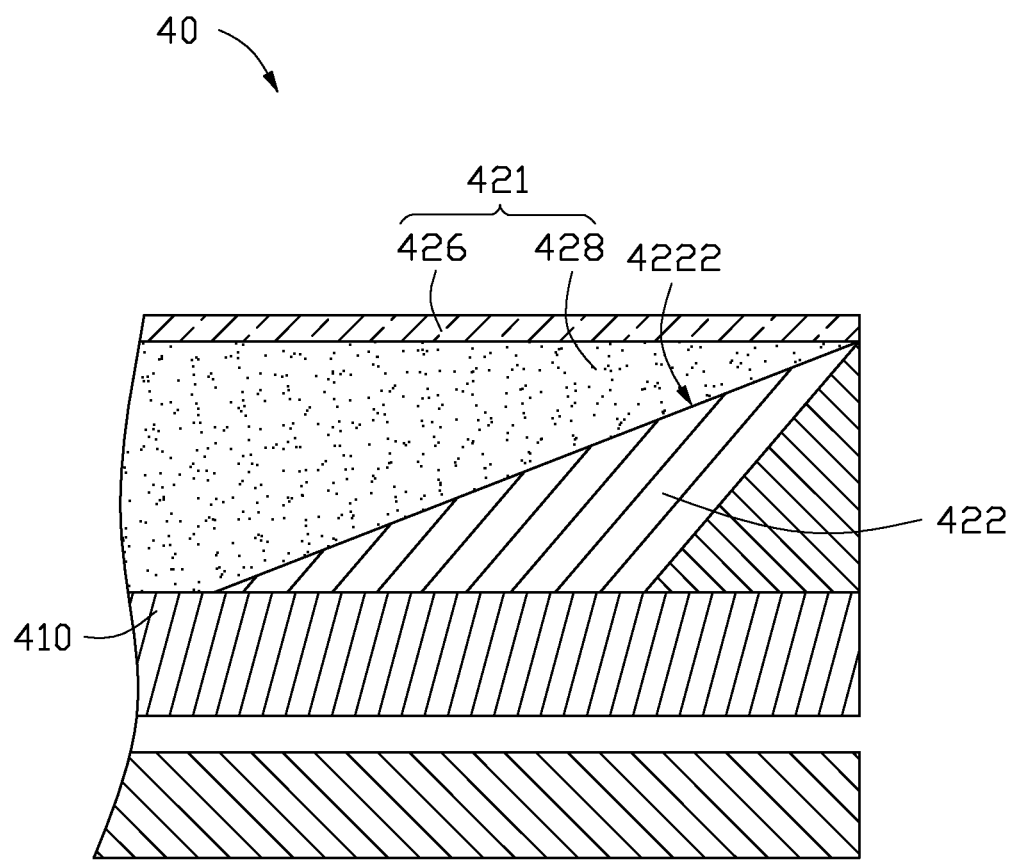
FIG. 12 is a cross-sectional view of a fourth kind of display device of the present disclosure.

Referring to FIG. 12, FIG. 12 is a cross-sectional view of a fourth kind of display device 40 of the present disclosure. The main difference between the fourth embodiment of the display device 40 and the first embodiment of the display device 10 is that a transmission portion 421 is different. In detail, the transmission portion 421 includes a transparent plate 426 and a glue body 428 positioned in a space between a first emitting surface 4222 of a compensation portion 422 and a main display region 410. The transparent plate 426 is positioned in one side of the glue body 428 away from the main display region 410 and covers the compensation portion 422.

Figure 13:
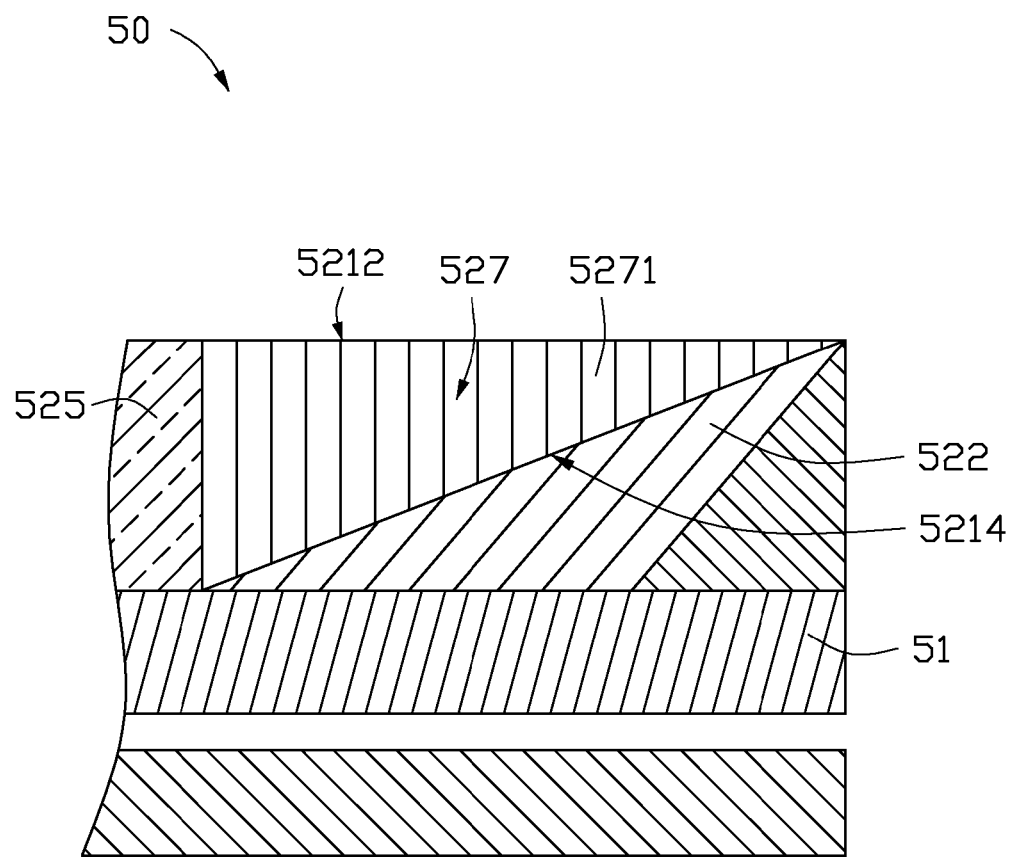
FIG. 13 is a cross-sectional view of a fifth kind of display device of the present disclosure.

Referring to FIG. 13, FIG. 13 is a cross-sectional view of a fifth kind of display device 50 of the present disclosure. The main difference between the fifth embodiment of the display device 50 and the second embodiment of the display device 20 is that an edge portion 527 includes a plurality of light guiding channels 5271 independent from each other, which extend from a first connecting surface 5214 to a part of a first light emitting surface 5212 of the edge portion 527.

In detail, the extension direction of the light guiding channels 5271 vertically intersects the first light emitting surface 5212 and a display panel 51.

Figure 14:
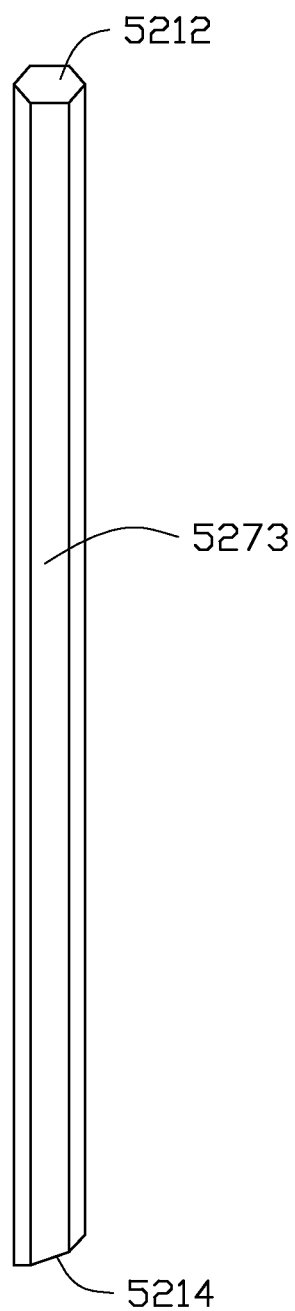
FIG. 14 is a diagrammatic view of one kind of light guiding fiber of FIG. 13.

Similar to a light guiding channel of a compensation portion 522, the light guiding channels 5271 can be made of a light guiding fiber 5273. Referring to FIG. 14, FIG. 14 is a diagrammatic view of one kind of light guiding fiber 5273 of the light guiding channels 5271. A cross-sectional area of the light guiding fiber 5273 is maintained constantly, which means a diameter of each light guiding fiber 5273 is constant. Further, the light guiding channels 5271 can also be formed of a plurality of optical fibers, the light guide plate, a quartz optical fiber, the glass fiber and other optical materials arrayed together.

Figure 15:
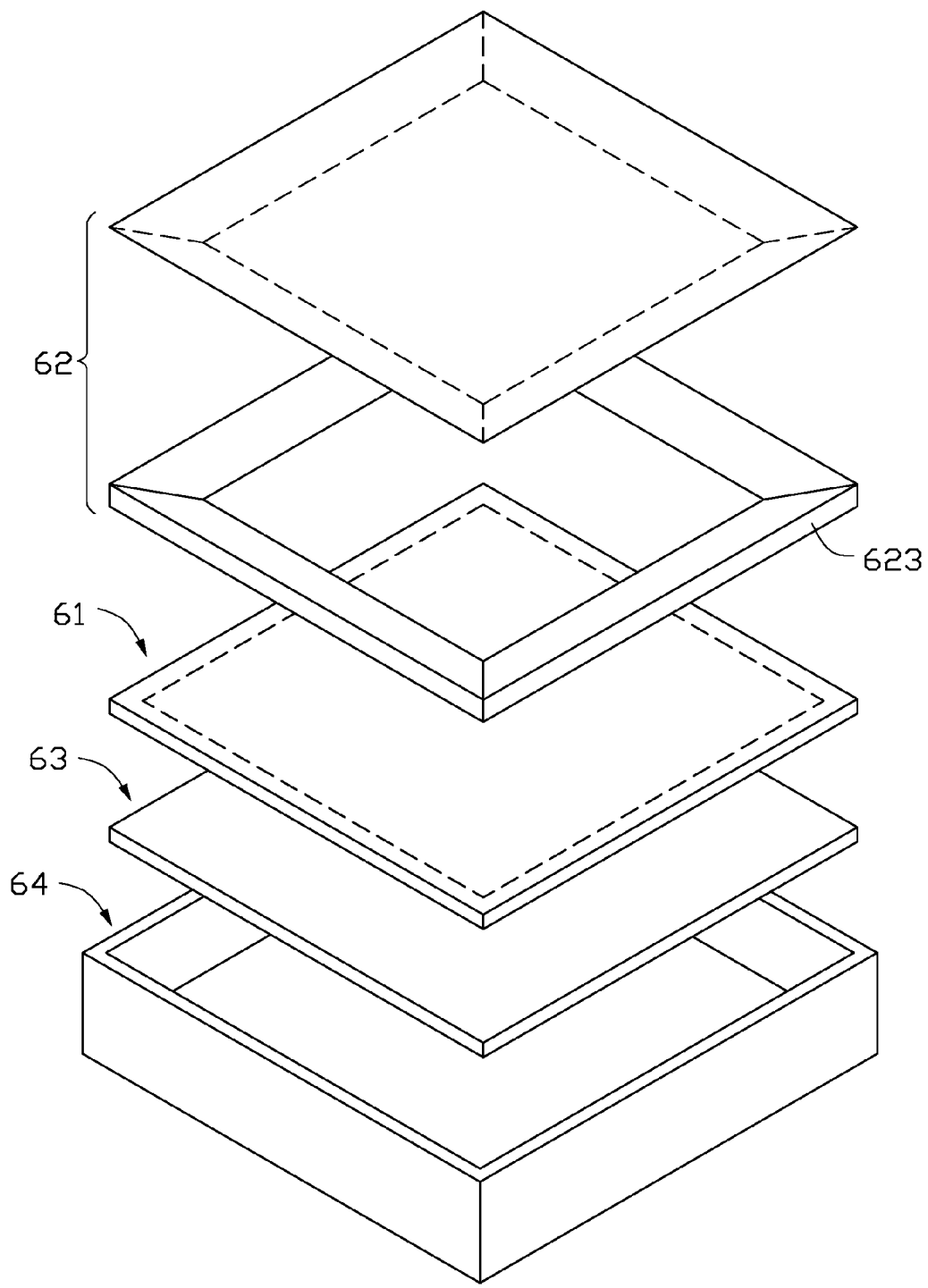
FIG. 15 is an exploded view of a sixth kind of display device of the present disclosure.
Figure 16:
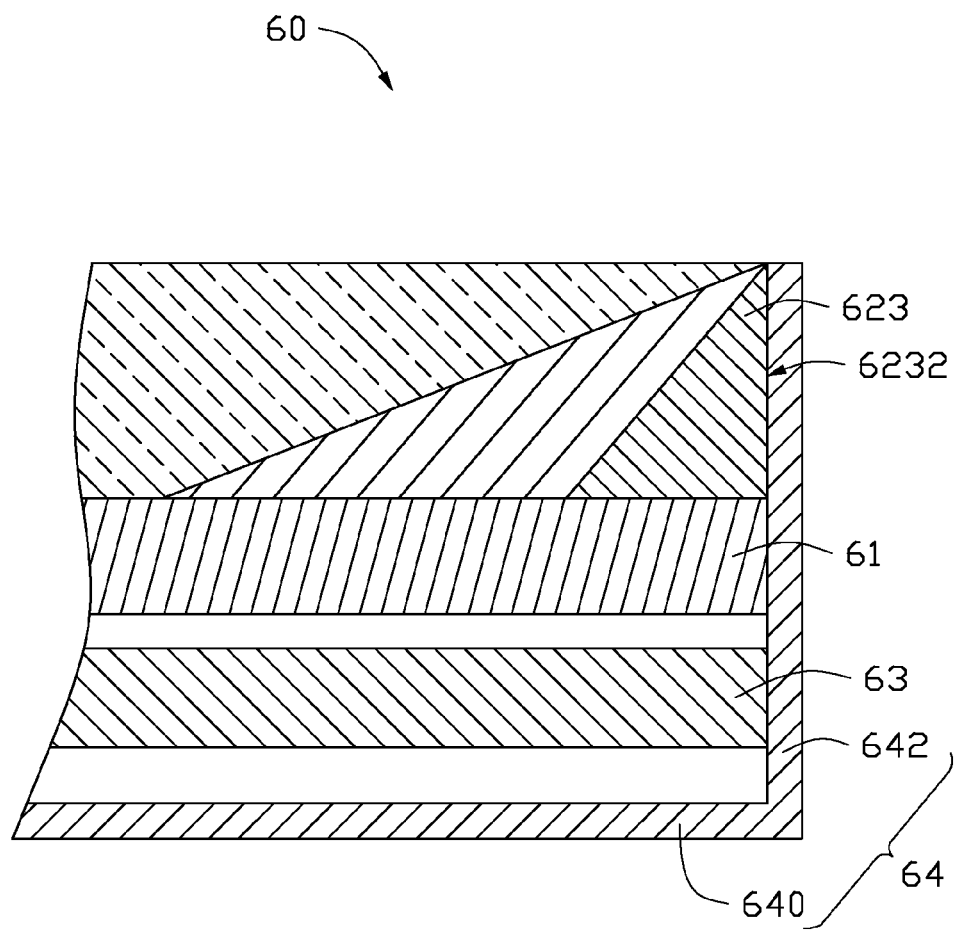
FIG. 16 is a cross-sectional view of the display device of FIG. 15.

FIG. 15 is an exploded view of a sixth kind of display device 60 of the present disclosure. FIG. 16 is a cross-sectional view of the display device 60 of FIG. 15. Basically, the sixth embodiment of the display device 60 is similar to the first embodiment of the display device 10. The main difference is that the display device 60 includes a display panel 61, a cover lens 62, and a frame 64 of a backlight module 63. In detail, the frame 64 includes a bottom plate 640 and a side wall 642 vertically connected to the bottom plate 640. The backlight module 63, the display panel 61, and the cover lens 62 are positioned in a space defined by the bottom plate 640 and the side wall 642. The backlight module 63 is positioned between the bottom plate 640 and the display panel 61. Further, in this embodiment, a first side surface 6232 of a support portion 623 is attached to the side wall 642 so that the frame 64 and the cover lens 62 can be fastened together. In detail, the support portion 623 can be bonded to the inner surface of the side wall 642 by glue or by a fixed structure.

Figure 17:
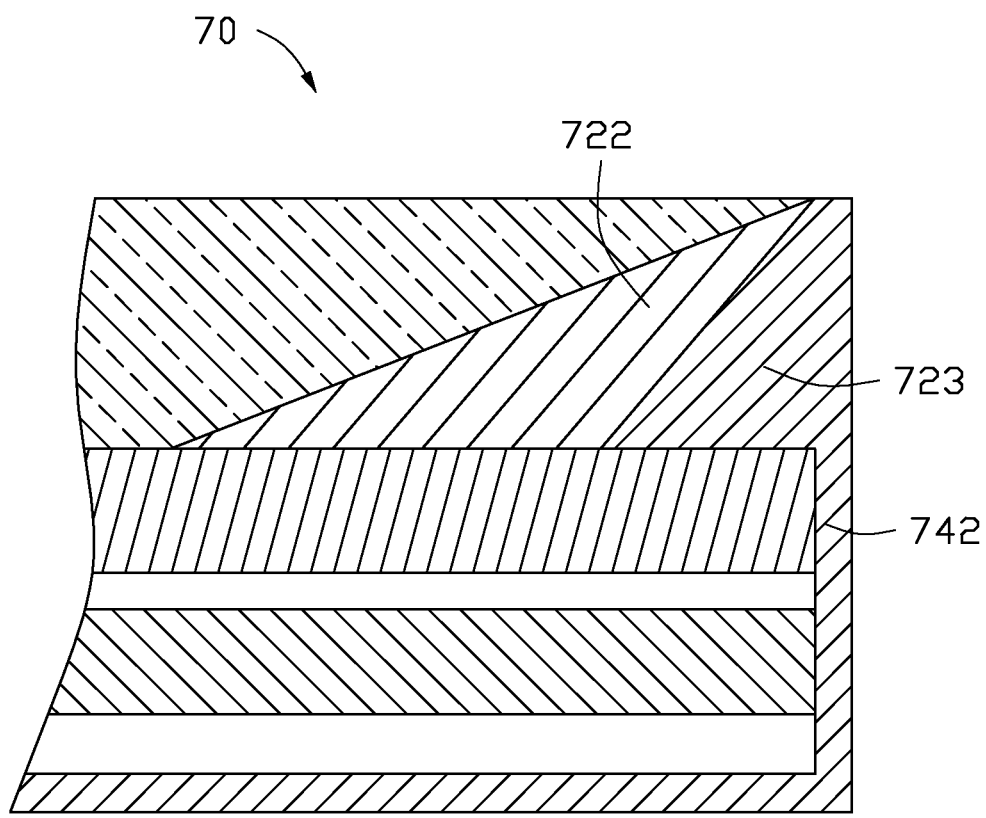
FIG. 17 is a cross-sectional view of a seventh kind of display device of the present disclosure.

Referring to FIG. 17, FIG. 17 is a cross-sectional view of a seventh kind of display device 70 of the present disclosure. The main difference between the seventh embodiment of the display device 70 and the first embodiment of the display device 10 is that a support portion 723 and a side wall 742 of the frame are integrally formed. In detail, the support portion 723 and the side wall 742 of the frame can be integrally injected or can be molded by injection, and then combined with a compensation portion 722 in order to fasten a cover lens to the frame.

Figure 18:
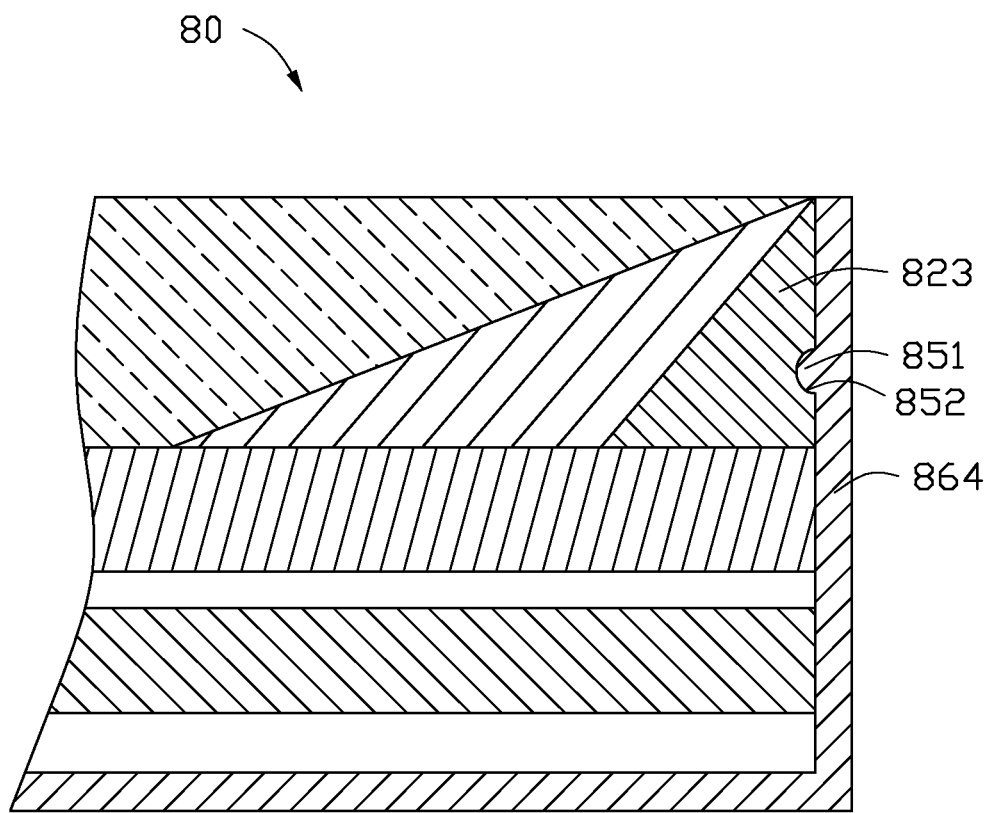
FIG. 18 is a cross-sectional view of a eighth kind of display device of the present disclosure.

Referring to FIG. 18, FIG. 18 is a cross-sectional view of a eighth kind of display device 80 of the present disclosure. The main difference between the eighth embodiment of the display device 80 and the first embodiment of the display device 10 is that a support portion 823 is attached to a side wall of the fame through a fixed structure. In detail, the side wall of the fame includes a protrusion 851 and the support portion 823 includes a corresponding recess 852. Further, the protrusion 851 is received in the corresponding recess 852 such that a cover lens is fastened to the frame.

Figure 19:
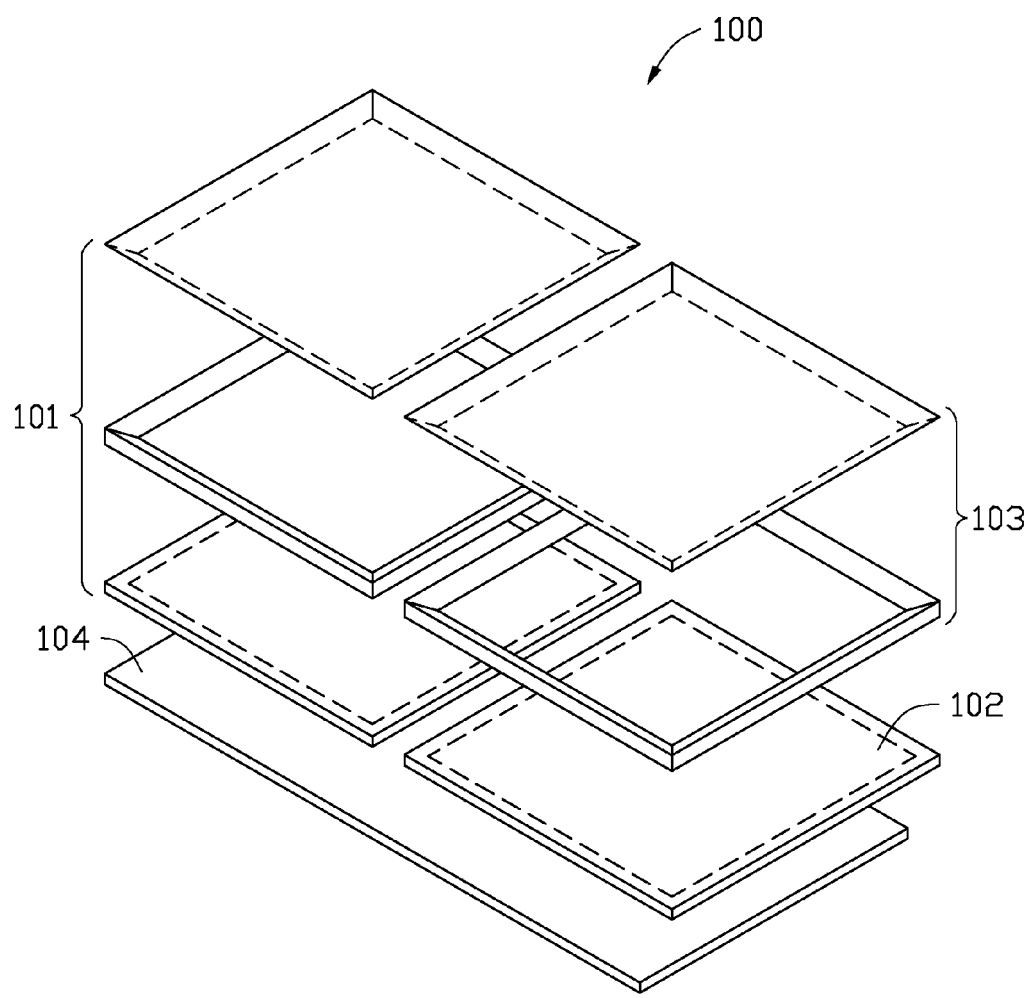
FIG. 19 is an exploded view of a first kind of joint display device of the present disclosure.
Figure 20:
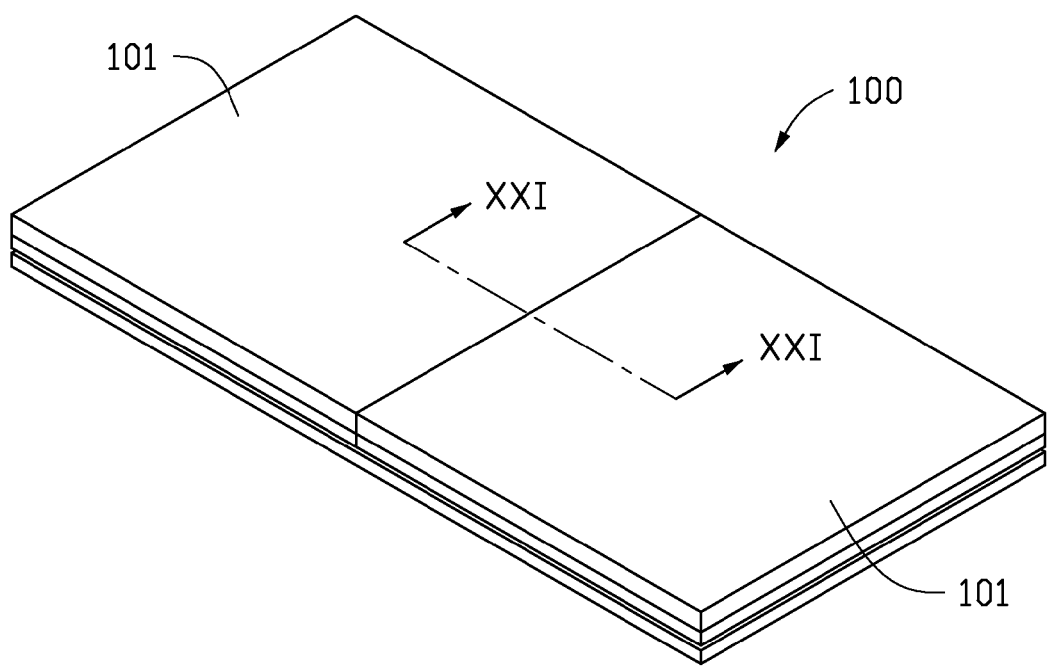
FIG. 20 is an isometric view of one kind of joint display device of FIG. 19.
Figure 21:
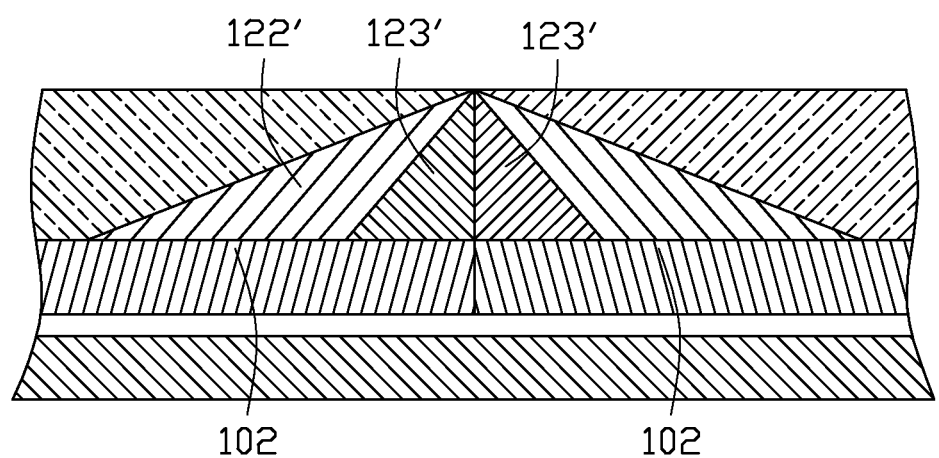
FIG. 21 is a cross-sectional view taken along line XXI-XXI of FIG. 20.

Referring to FIG. 19, FIG. 20, and FIG. 21, FIG. 19 is an exploded view of a first kind of a joint display device 100 of the present disclosure. FIG. 20 is an isometric view of one kind of joint display device 100 of FIG. 19. FIG. 21 is a cross-sectional view taken along line XXI-XXI of FIG. 20. The joint display device 100 includes two display devices 101 joined in parallel together. The display device 101 is similar to the display device 10 of the first embodiment. In detail, each display device 101 includes a display panel 102 and a cover lens 103 covered a display side of the display panel 102. The display panel 102 and the cover lens 103 can be the same as the display panel 11 and the cover lens 12 of the display device 10 of the first embodiment. In other words, the description of the display panel 11 and the cover lens 12 of the display device 10 of the first embodiment can be also applied to the display panel 102 and the cover lens 103 of the display device 101. Further, it can be understood that by using different embodiments as mentioned above, the display device 20 to 60 of the above-mentioned second to the sixth embodiment can also be applied to the display panel 102 and the cover lens 103 of the joint display device 100.

In the present embodiment, the display panel 102 can be a liquid crystal display panel so the joint display device 100 further includes a backlight module 104 in order to provide incident light for two display panels 102.

Referring to FIG. 21, two display panels 102 are joined together on the same plane by combining two display devices 101 and two cover lenses 103. In detail, both sides of two display panels 102 are glued together so that two display panels 102 are fastened together. The support portions 123' of two cover lenses 103 can also be glued together so that two cover lenses 103 are fastened together too.

Figure 22:
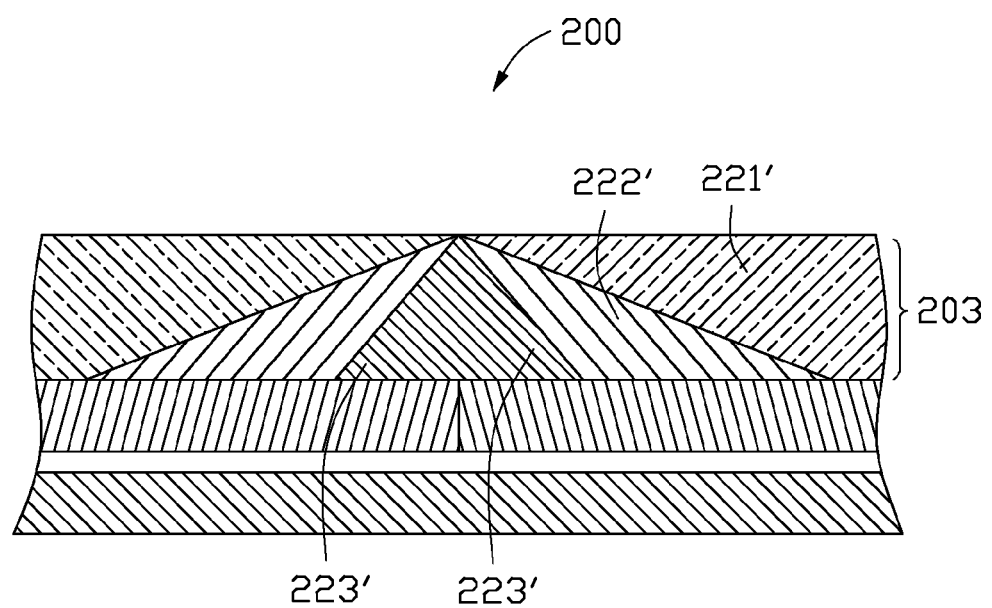
FIG. 22 is a cross-sectional view of a second kind of joint display device of the present disclosure.

Referring to FIG. 22, FIG. 22 is a cross-sectional view of a second kind of joint display device 200 of the present disclosure. Basically, the joint display device 200 is similar to the first embodiment of the joint display device 100. The main difference is that two support portions 223' of a cover lens 203 are integrally formed so that two cover lenses 203 are fastened together. In detail, two support portions 223' can be integrally injected in the same manufacturing process and then combined with a compensation portion 222' and a transmission portion 221' in order to fasten two cover lenses 203 together.

Figure 23:
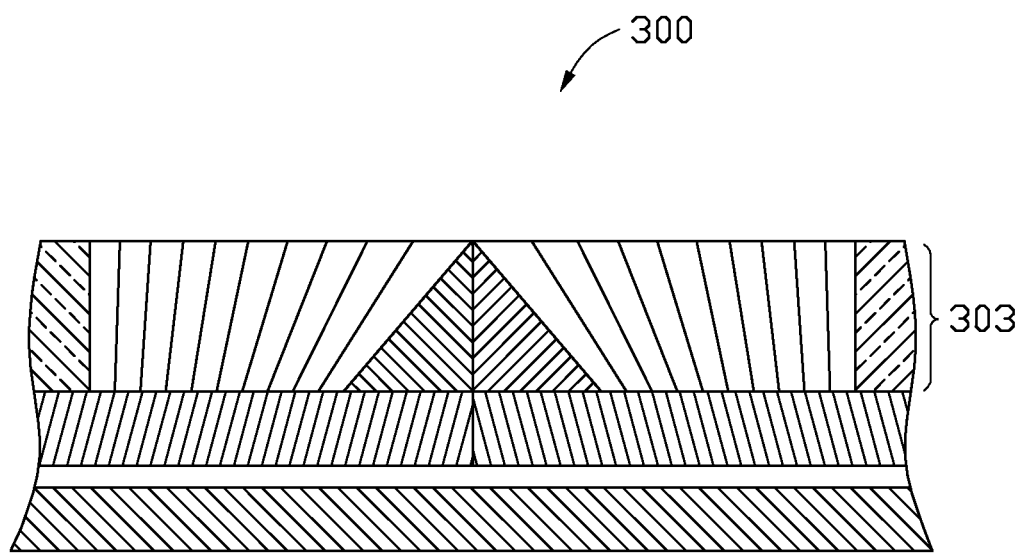
FIG. 23 is a cross-sectional view of a third kind of joint display device of the present disclosure.

Referring to FIG. 23, FIG. 23 is a cross-sectional view of a third kind of joint display device 300 of the present disclosure. Basically, the joint display device 300 is similar to the joint display device 100 of FIG. 15. The main difference is that a cover lens 303 of the third embodiment is similar to a cover lens 32 of FIG. 8.

Figure 24:
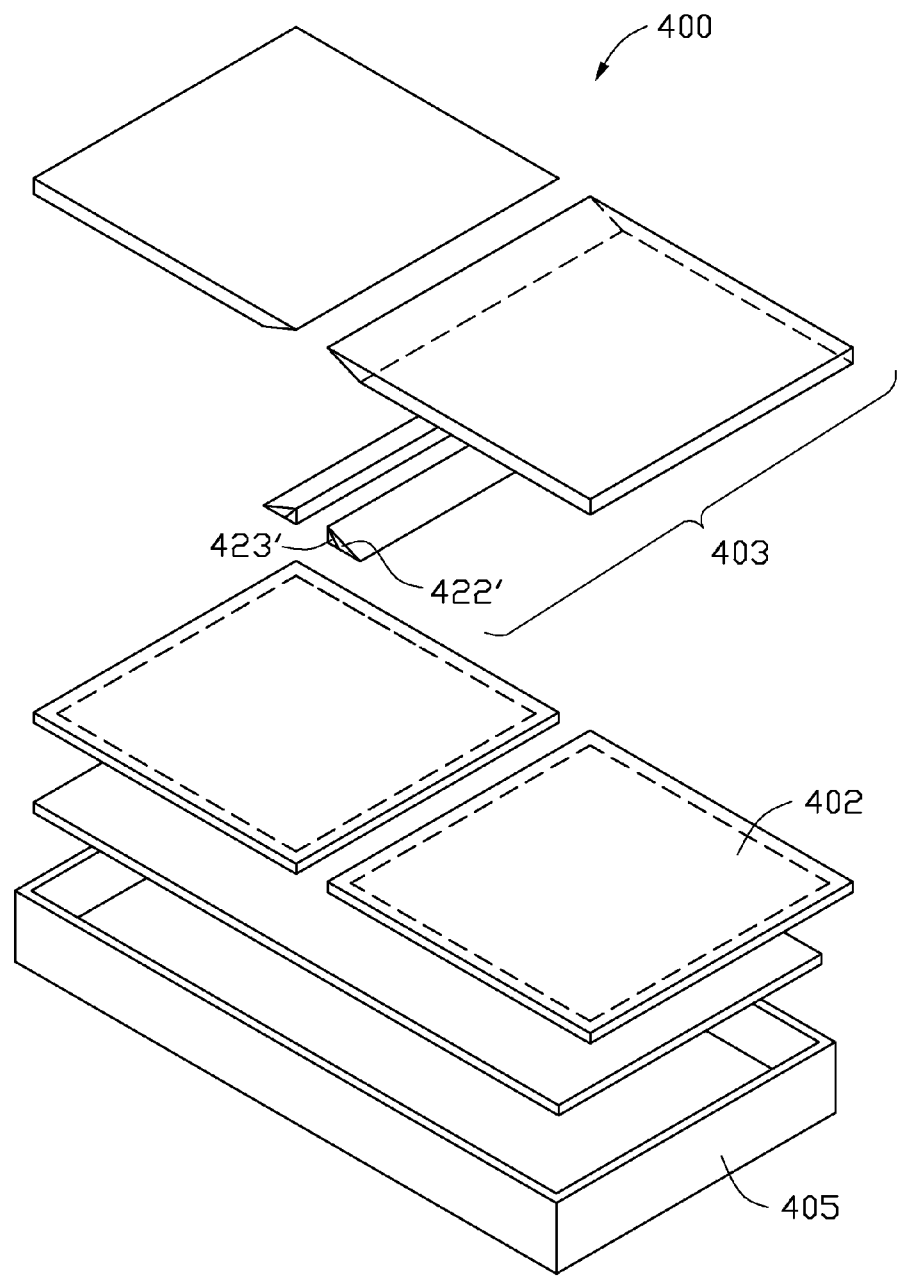
FIG. 24 is a cross-sectional view of a fourth kind of joint display device of the present disclosure.

Referring to FIG. 24, FIG. 24 is a cross-sectional view of a fourth kind of joint display device 400 of the present disclosure. Basically, the joint display device 400 is similar to the joint display device 100. The main difference is that a cover lens 403 only includes a compensation port 422' and a support portion 423' between two display panels 402. Further, the joint display device 400 includes a backlight module 404 and a frame 405 of two display devices 401.

The embodiments shown and described above are only examples. Many details are often found in the art such as the other features of a display. Therefore, many such details are neither shown nor described. Even though numerous characteristics and advantages of the present technology have been set forth in the foregoing description, together with details of the structure and function of the present disclosure, the disclosure is illustrative only, and changes may be made in the details, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A display device, comprising:
    a display panel including a main display region and an edge display region;
    a cover lens including a transmission portion located on the main display region;
    a compensation portion located on the edge display region and configured to distribute an image of the edge display region to the outside of the edge display region away from the main display region; and the compensation portion including a light incident surface, a light emitting surface, and a light guiding channel, wherein the light guiding channel extends from the light incident surface to the light emitting surface and an area of the light emitting surface is greater than an area of the light incident surface; a cross-sectional area of the light guiding channel increases gradually from the light incident surface to the light emitting surface.

2. The display device of claim 1, wherein the light incident surface positioned parallel to the edge display region and the light emitting surface define an acute angel.

3. The display device of claim 1, wherein the transmission portion further includes a bottom surface, a top surface and an intermediate surface positioned between the bottom surface and the top surface, the top surface of the transmission portion and the light emitting surface of the compensation portion constitute a display surface of the display device, and the compensation portion further includes a connecting surface positioned between the light incident surface and the light emitting surface, and the connecting surface is overlapped with the intermediate surface of the transmission portion.

4. The display device of claim 1, wherein the compensation portion further includes an inclined surface connected between the light incident surface and the light emitting surface, and the inclined surface positioned on a side away from the main display region and the light incident surface define an obtuse angel.

5. The display device of claim 1, wherein the display panel further includes a non-display region positioned outside of the edge display region and the image is distributed from the edge display region to the non-display region through the compensation portion.

6. The display device of claim 1, wherein the light guiding channel is defined by a plurality of light guiding fibers.

7. The display device of claim 1, wherein a cross-sectional area of the light guiding channel in a vertical direction is maintained constant.

8. A joint display device, comprising:
at least two display devices positioned parallel to each other;
the display device further comprising:
a display panel including a main display region and an edge display region;
a cover lens including a transmission portion located on the main display region;
a compensation portion located on the edge display region and configured to distribute an image of the edge display region to the outside of the edge display region away from the main display region; and the compensation portion including a light incident surface, a light emitting surface, and a light guiding channel, wherein the light guiding channel extends from the light incident surface to the light emitting surface and an area of the light emitting surface is greater than an area of the light incident surface; a cross-sectional area of the light guiding channel increases gradually from the light incident surface to the light emitting surface.

9. The joint display device of claim 8, wherein the light incident surface positioned parallel to the edge display region and the light emitting surface define an acute angel.

10. The joint display device of claim 8, wherein the transmission portion includes a bottom surface, a top surface and an intermediate surface positioned between the bottom surface and the top surface, the top surface of the transmission portion and the light emitting surface of the compensation portion constitute a display surface of the display device, and the compensation portion further includes a connecting surface positioned between the light incident surface and the light emitting surface, and the connecting surface is overlapped with the intermediate surface of the transmission portion.

11. The joint display device of claim 8, wherein the compensation portion further includes an inclined surface connected between the light incident surface and the light emitting surface and the inclined surface positioned on a side away from the main display region and the light incident surface define an obtuse angel.

12. The joint display device of claim 11, wherein the cover lens further includes a support portion of the inclined surface supporting the compensation portion.

13. The joint display device of claim 12, wherein the display device further includes a jointing portion having the support portion and the compensation portion and the support portion of the jointing portion between at least two display devices is an integrated structure.

14. The joint display device of claim 8, wherein the display panel further includes a non-display region positioned outside of the edge display region and the image is distributed from the edge display region to the non-display region through the compensation portion.

15. The joint display device of claim 8, wherein the light guiding channel is defined by a plurality of light guiding fibers.

16. The joint display device of claim 8, wherein a cross-sectional area of the light guiding channel in a vertical direction is maintained constant.

17. The joint display device of claim 8, wherein the joint display device further includes a backlight module positioned on a side away from at least two display devices using the same backlight module.

* * * * *